United States Patent
Tanaka et al.

(10) Patent No.: US 7,460,665 B2
(45) Date of Patent: Dec. 2, 2008

(54) CIPHER STRENGTH EVALUATION APPARATUS

(75) Inventors: Hidema Tanaka, Koganei (JP);
Toshinobu Kaneko, Noda (JP);
Nobuyuki Sugio, Noda (JP)

(73) Assignee: National Institute of Information and Communications Technology, Tokyo (JP)

( * ) Notice: Subject to any disclaimer, the term of this patent is extended or adjusted under 35 U.S.C. 154(b) by 818 days.

(21) Appl. No.: 10/762,654

(22) Filed: Jan. 21, 2004

(65) Prior Publication Data

US 2005/0157879 A1 Jul. 21, 2005

(51) Int. Cl.
*H04K 3/00* (2006.01)
*H04K 1/00* (2006.01)

(52) U.S. Cl. .................. 380/1; 380/2; 380/277; 726/25

(58) Field of Classification Search .......... 380/1, 380/2; 726/25
See application file for complete search history.

(56) References Cited

U.S. PATENT DOCUMENTS

| | | | | |
|---|---|---|---|---|
| 6,411,715 | B1 * | 6/2002 | Liskov et al. | 380/277 |
| 6,504,929 | B1 * | 1/2003 | Tsunoo | 380/28 |
| 7,051,202 | B2 * | 5/2006 | Tsunoo | 713/165 |
| 7,187,769 | B1 * | 3/2007 | Moriai et al. | 380/1 |
| 7,340,053 | B2 * | 3/2008 | Tanaka et al. | 380/28 |
| 2005/0117742 | A1 * | 6/2005 | Tanaka et al. | 380/28 |
| 2005/0160262 | A1 * | 7/2005 | Tanaka et al. | 713/166 |
| 2005/0235342 | A1 * | 10/2005 | Ene-Pietrosanu et al. | 726/6 |
| 2005/0257069 | A1 * | 11/2005 | Tanaka et al. | 713/189 |

FOREIGN PATENT DOCUMENTS

| JP | 11065438 | * | 8/1997 |
|---|---|---|---|
| JP | 0932272 | * | 7/1999 |
| JP | 11231773 | * | 8/1999 |

OTHER PUBLICATIONS

S.Moriai, T.Shimoyama, T.Kaneko, "Higher Order Attack of a CAST Cipher", Fast Software Encryption 1998, FSE-4th, LNCS. 1372. 1998.
T.Shimoyama, S.Moriai, T.Kaneko and S.Tsuji,"Improved Higher Order Differential Attack and Its Application to Nyberg-Knudsen's Designed Block Cipher", IEICE Trans. Fundamen tals, vol. E82-A, No. 9 pp. 1971-1980, 1999.

* cited by examiner

*Primary Examiner*—Jung Kim

(57) ABSTRACT

An object is to evaluate the strength in consideration of the relationship held between keys, to allow the detection of a weak key condition to lower the difficulty in decrypting ciphertext, and to detect a weak key based on the weak key condition. Based on the relationship between keys in a key schedule and based on estimated keys, a certain estimated extended key can be calculated by utilizing the relationship between the estimated extended key in the key schedule and an estimated extended key having been calculated, and cost information required for calculation is outputted to allow the verification of a weak key condition. A weak key can be detected based on the weak key condition, and the difficulty in decrypting ciphertext can be increased without modifying an encryption apparatus.

8 Claims, 13 Drawing Sheets

Fig. 11 MISTY1

CIPHER STRENGTH EVALUATION APPARATUS

BACKGROUND OF THE INVENTION

Traditionally, in order to avoid information leakage and manipulation, encryption algorisms are used to encrypt information.

The encryption algorism is that includes a plurality of stirring steps of accepting unstirred text, stirring the unstirred text with an extended key calculated from a user key and outputting it as stirred text, in which plaintext is encrypted step by step to output ciphertext.

The usefulness of the encryption algorism is a high degree of the difficulty of decryption, which can be evaluated from costs that ciphertext is actually decrypted to measure the number of plaintext and the complexity required for decryption.

More specifically, decryption is performed in which partial extended keys are determined individually and the remaining extended keys are determined based on unstirred text calculated with the determined extended keys.

However, the inventor found that particularly in the case where the calculation of extended keys based on a user key is simple, the extended key relates to the user key or a plurality of the extended keys relates to each other, and then these relationships are used to allow decryption at lower costs.

In this case, the traditional decryption method of calculating keys individually is inadequate to evaluate degrees of the difficulty of decryption.

Then, the relationship held between segment bit patterns of each key is utilized to allow a cipher strength evaluation apparatus capable of evaluating degrees of the difficulty of decryption properly also in the case where the relationship like this is held.

Furthermore, the cipher strength evaluation apparatus like this outputs the costs required for calculating keys to allow verification whether a key condition is true or not, the key condition is formed of segment bit patterns relating to a plurality of keys and is estimated to facilitate decryption by utilizing the segment bit patterns. Moreover, a weak key detector different from the cipher strength evaluation apparatus detects inadequate keys and avoids them to be used based on a weak key condition that is the key condition to lower the difficulty of decryption. Thus, a higher degree of the difficulty of decryption can be obtained as the same encryption algorism is used.

SUMMARY OF THE INVENTION

More specifically, the relationship held deterministically or probabilistically between the segment bit pattern of the user key and the segment bit pattern of the extended key or between the segment bit patterns of a plurality of the extended keys, for example, are stored in a key information storing part beforehand to allow the use of information about the key schedule of an encryption algorism to be evaluated on the cipher strength thereof.

Furthermore, in the case where keys are sequentially estimated to evaluate cipher strength, the segment bit pattern of the key previously estimated is stored as key information in an estimated key information storing part, and then the key information is combined with the key relation information for use in estimating the segment bit pattern of the key to be calculated later.

Here, the segment bit pattern of the key is determined by each position and each value of one or a plurality of given bits forming the key, including the case of containing the value of the total bits of the key.

As the cipher strength evaluation apparatus like this, an apparatus can be considered as an example to calculate an estimated extended key at a certain stirring step which performs exhaustive search on uncertain parameters so as to be probabilistically advantageous based on a probabilistic relationship held between an extended key at that step and an extended key having been estimated at a step different from that step. The exhaustive search here is a method of inputting combinations of possible values on a predetermined set of bits.

In addition to this, an apparatus can be considered as an example to calculate an estimated extended key at a certain stirring step which uses an algebraic technique based on a deterministic relationship held between an extended key at that step and an extended key having been estimated at a step different from that step and determines the segment bit pattern of the estimated extended key at that step from the segment bit pattern of the estimated extended key at the different step to reduce unknowns for calculation by less complexity, or by using fewer pairs of plaintext and ciphertext. Additionally, the algebraic technique here is that can be expressed by combinations of linear equations or polynomials.

The deterministic relationship that can be used effectively by the algebraic technique sometimes requires many key conditions. However, also in this case, the exhaustive search and the algebraic technique are combined to determine extended keys at two steps to allow the use of the deterministic relationship based on fewer key conditions. Furthermore, it is possible to optimally combine probabilistic and deterministic key relationship information for use effectively.

However, when a certain key condition is just verified whether it is a weak key condition that is a key condition to lower the difficulty of decryption, the cipher strength evaluation apparatus does not need to calculate all the keys. It is fine to evaluate the calculation condition for the extended key to output cost information.

Here, for example, the cost information is calculation resources such as the number of plaintext required for calculating a right extended key by exhaustive search and the maximum, minimum and mean of complexity. The complexity is time required for processing, the number of bits on which exhaustive search needs to be done, the number of plaintext having been used, and the number of times having calculated a predetermined function.

The weak key condition thus revealed is formed of a plurality of segment bit patterns included in the user key and a plurality of the extended keys. With the use of a weak key detector having a key schedule part as similar to that provided for the corresponding encryption apparatus, a weak key information storing part for storing weak key information which is information relating to weak keys, and a determining part main body for determining whether each key satisfies the weak key condition for outputting a detection signal, weak user keys can be detected efficiently in block encryption algorisms and Feistel encryption algorisms.

REFERENCES

[1] S. Moriai, T. Shimoyama, and T. Kanekb, "Higher Order Differential Attack of a CAST Cipher:' Fast Software Encryption Workshop'98, FSE'98, Paris, March, 1998.

[2] T. Shimoyama, S. Moriai, T. Kaneko, and S. Tsujii, "Improving Higher Order Differential Attack and Its Application to Nyberg-Knudsen's Designed Block Cipher," IEICE Trans. Fundamentds, Vol. E82-A, No. 9, pp. 1971-1980, September, 1999.

BRIEF DESCRIPTION OF THE DRAWINGS

The teachings of the invention can be readily understood by considering the following detailed description in conjunction with the accompanying drawings, in which.

DESCRIPTION OF THE PREFERRED EMBODIMENT

Hereinafter, a first embodiment according to the invention will be described.

A cipher strength evaluation apparatus is configured to assume a certain condition for a user key of MISTY of an encryption apparatus, a Feistel block-cipher apparatus formed of six stirring parts, to calculate extended keys at sixth and fifth steps and the user key, and to calculate costs required for decrypting the user key.

Figure 1:
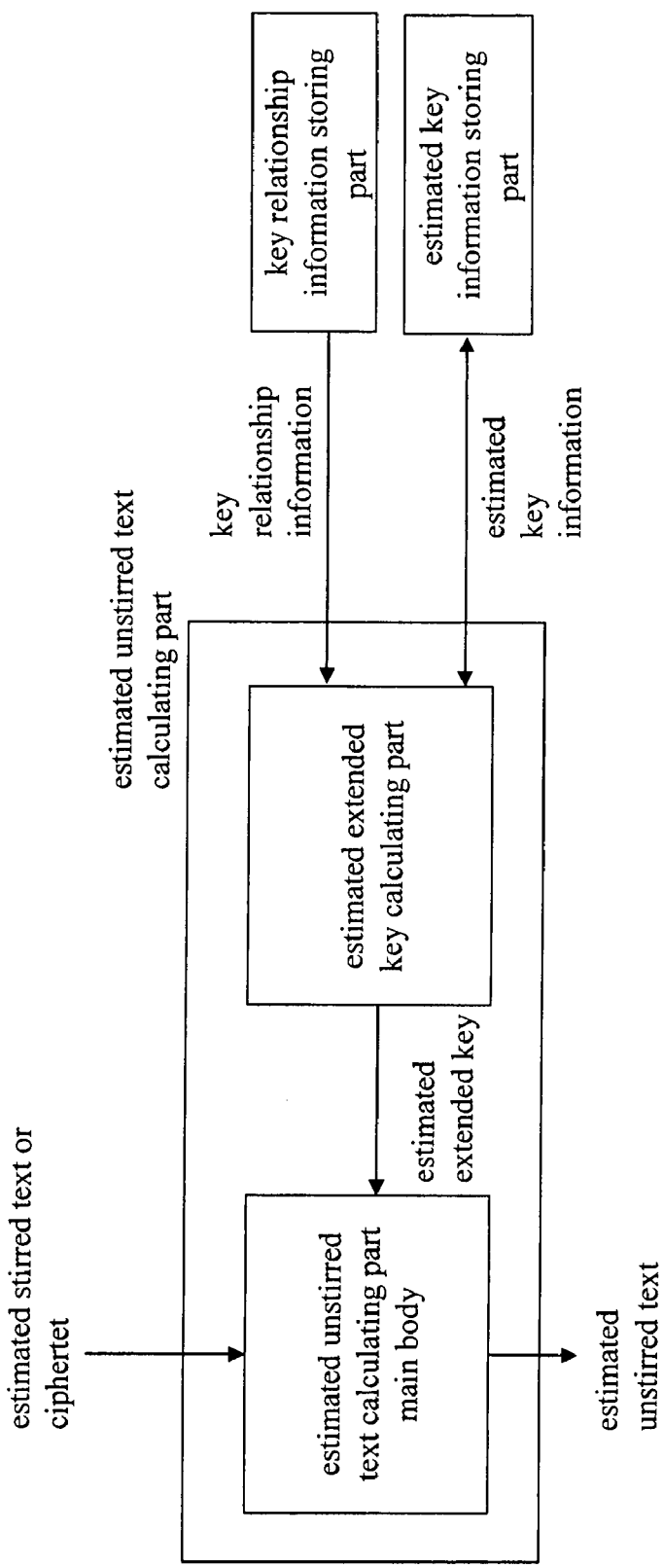
FIG. 1 is a function configuration diagram illustrating functions relating to claims 1 and 2 according to the invention.
Figure 2:
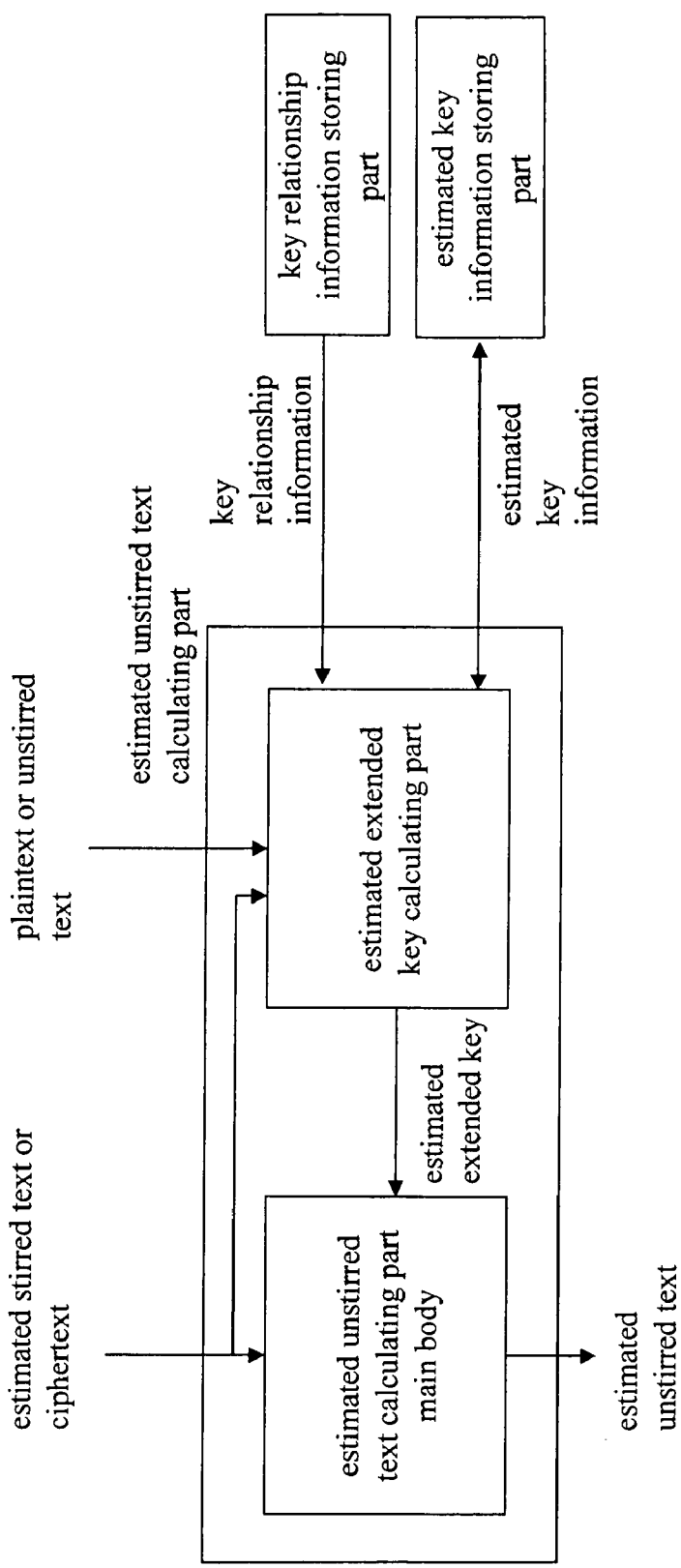
FIG. 2 is a function configuration diagram illustrating functions relating to claim 3 according to the invention.
Figure 3:
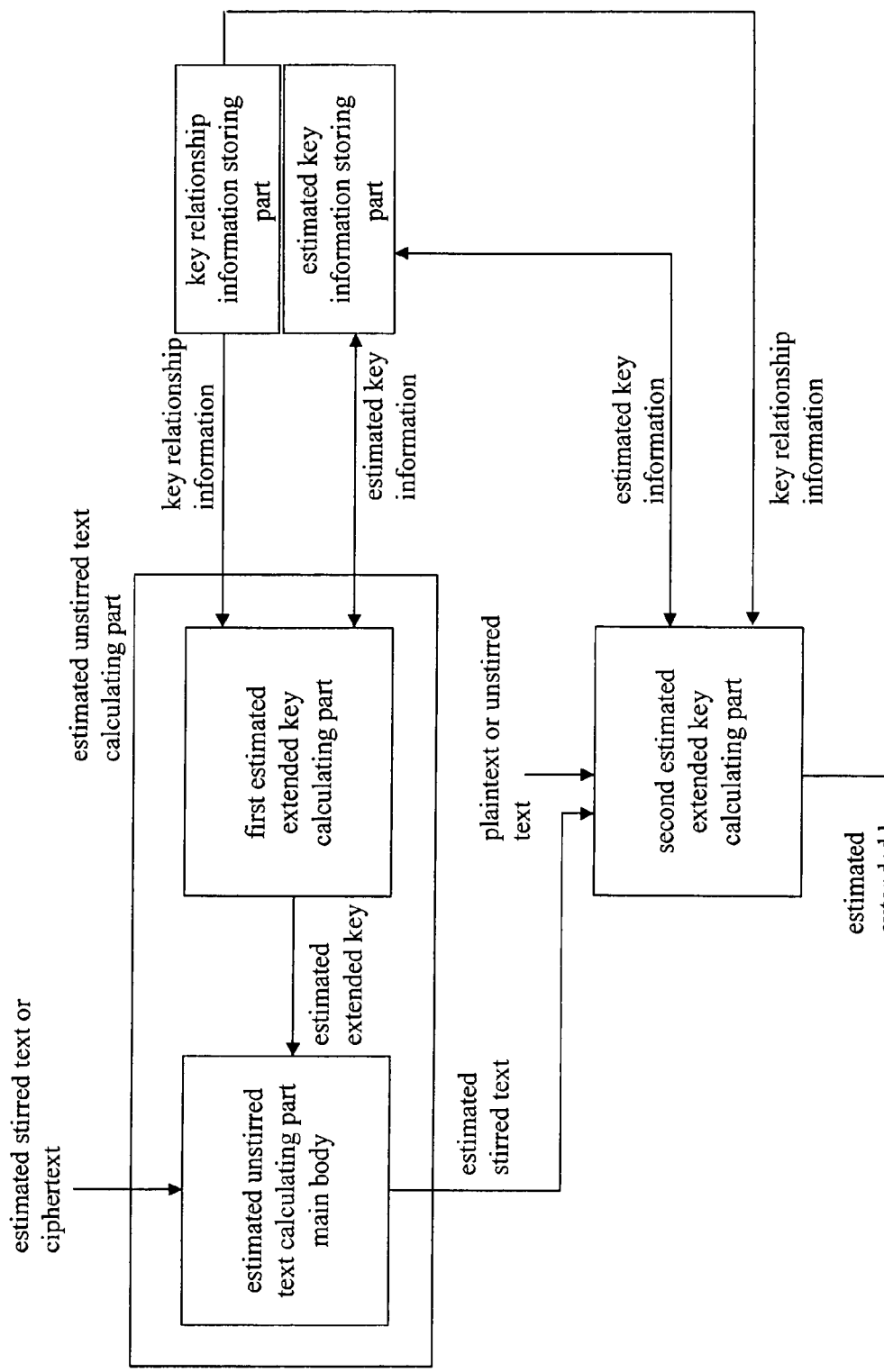
FIG. 3 is a function configuration diagram illustrating functions relating to claim 4 according to the invention.
Figure 4:
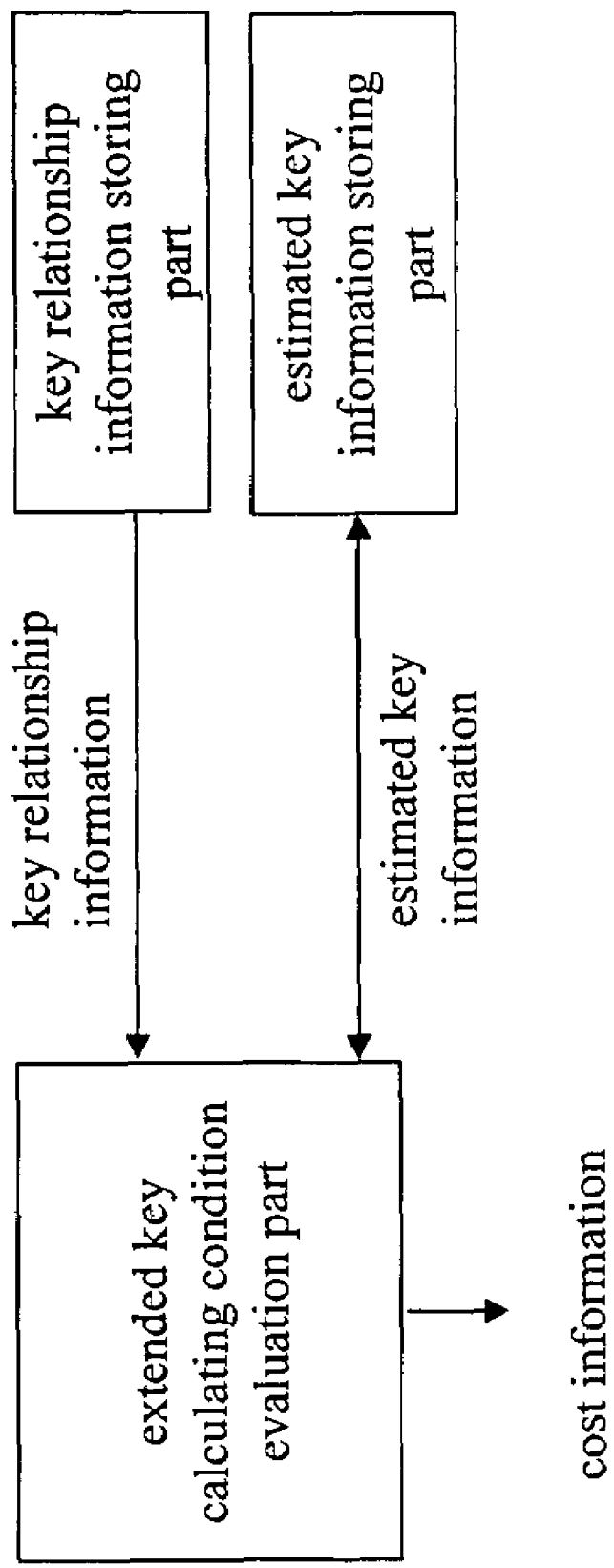
FIG. 4 is a function configuration diagram illustrating functions relating to claims 5 and 6 according to the invention.
Figure 5:
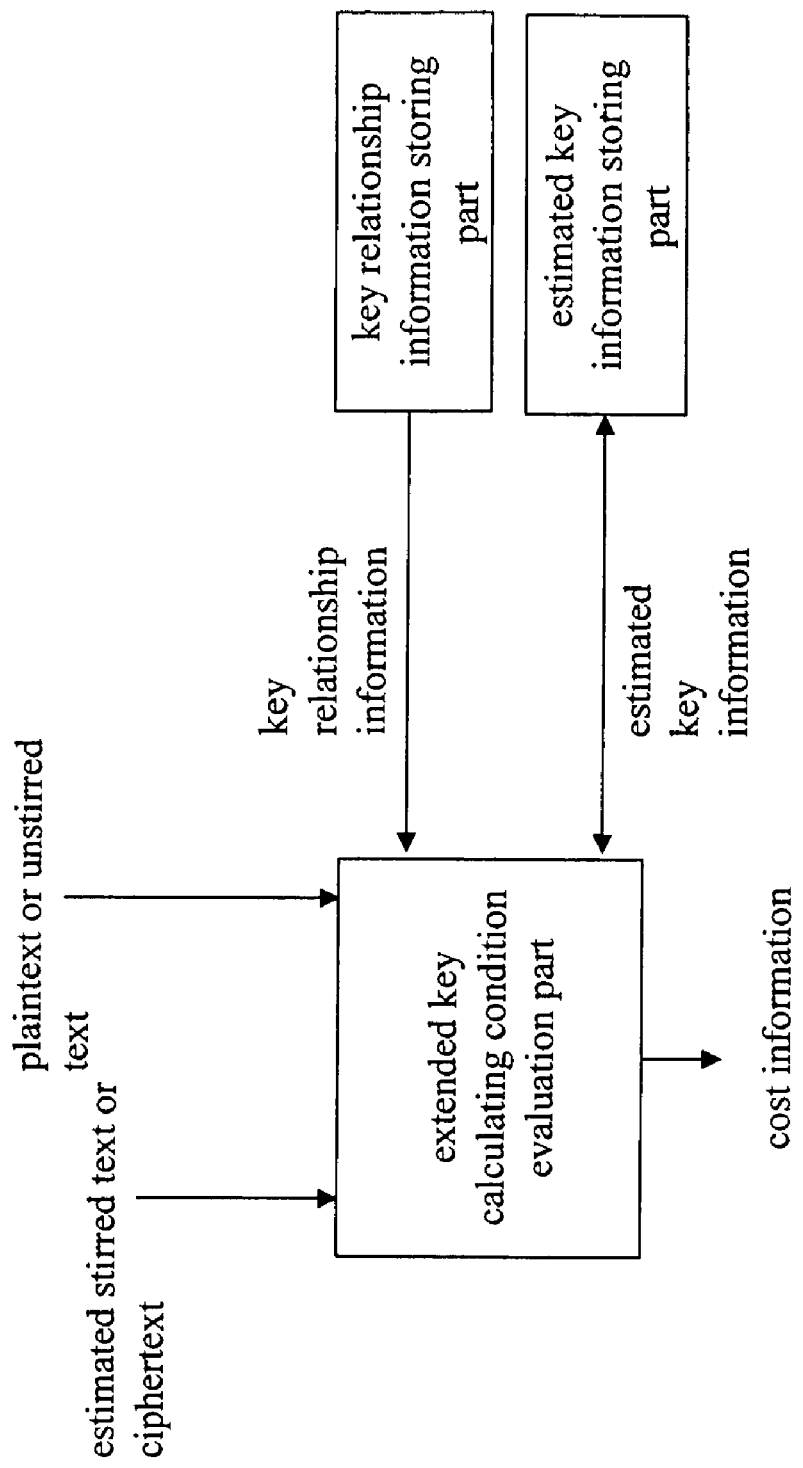
FIG. 5 is a function configuration diagram illustrating functions relating to claim 7 according to the invention.
Figure 6:
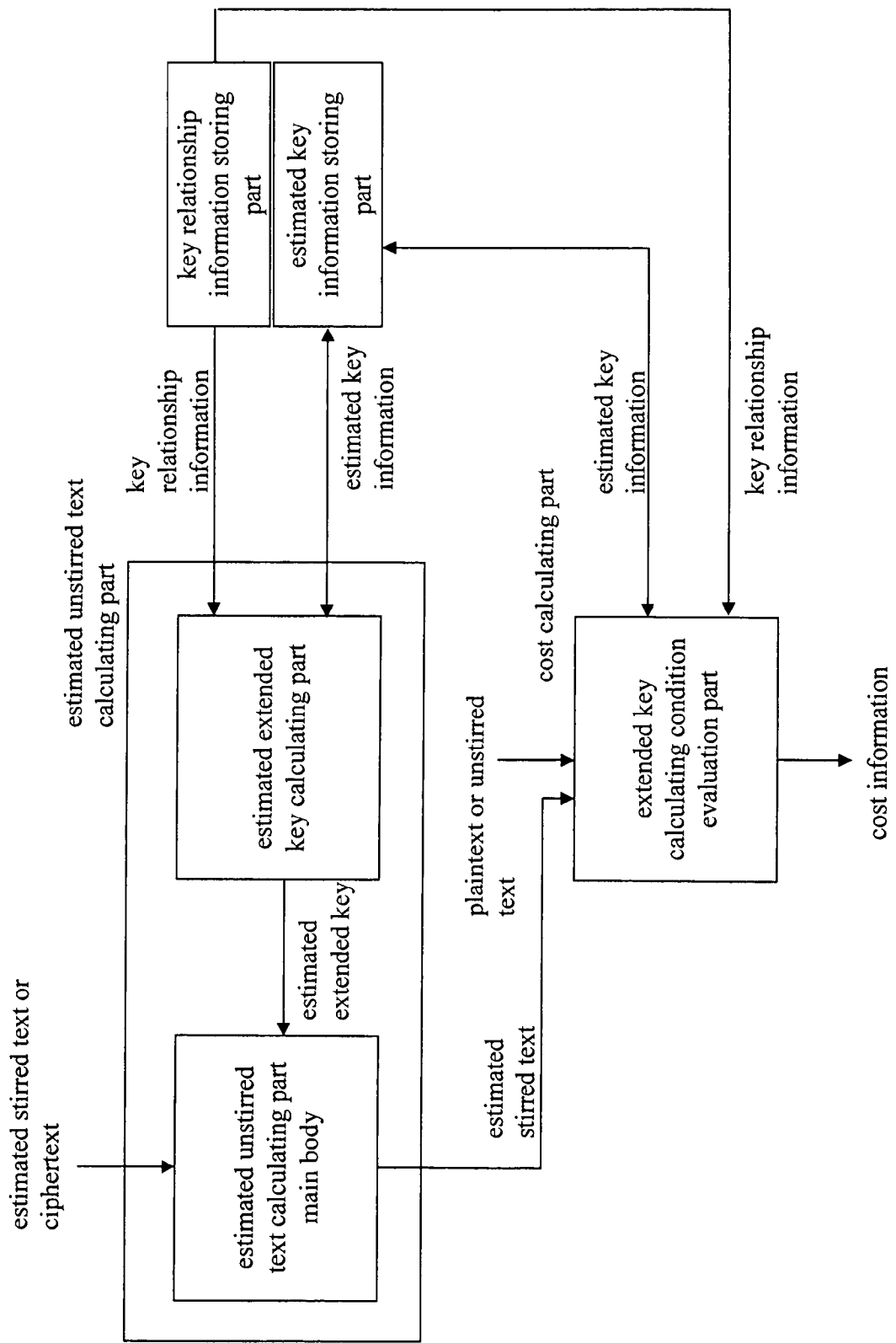
FIG. 6 is a function configuration diagram illustrating functions relating to claim 8 according to the invention.
Figure 7:
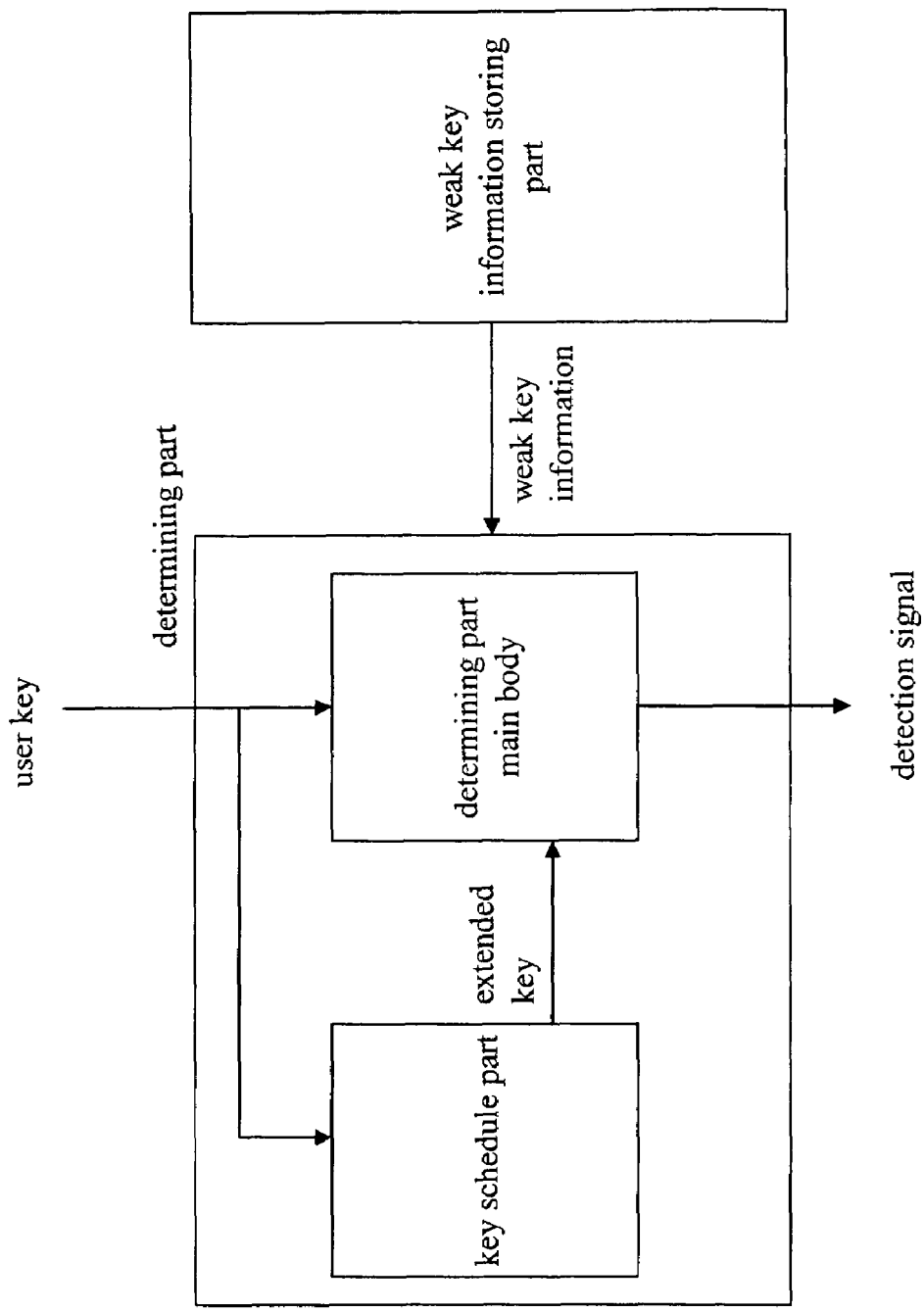
FIG. 7 is a function configuration diagram illustrating functions relating to claim 9 according to the invention.
Figure 8:
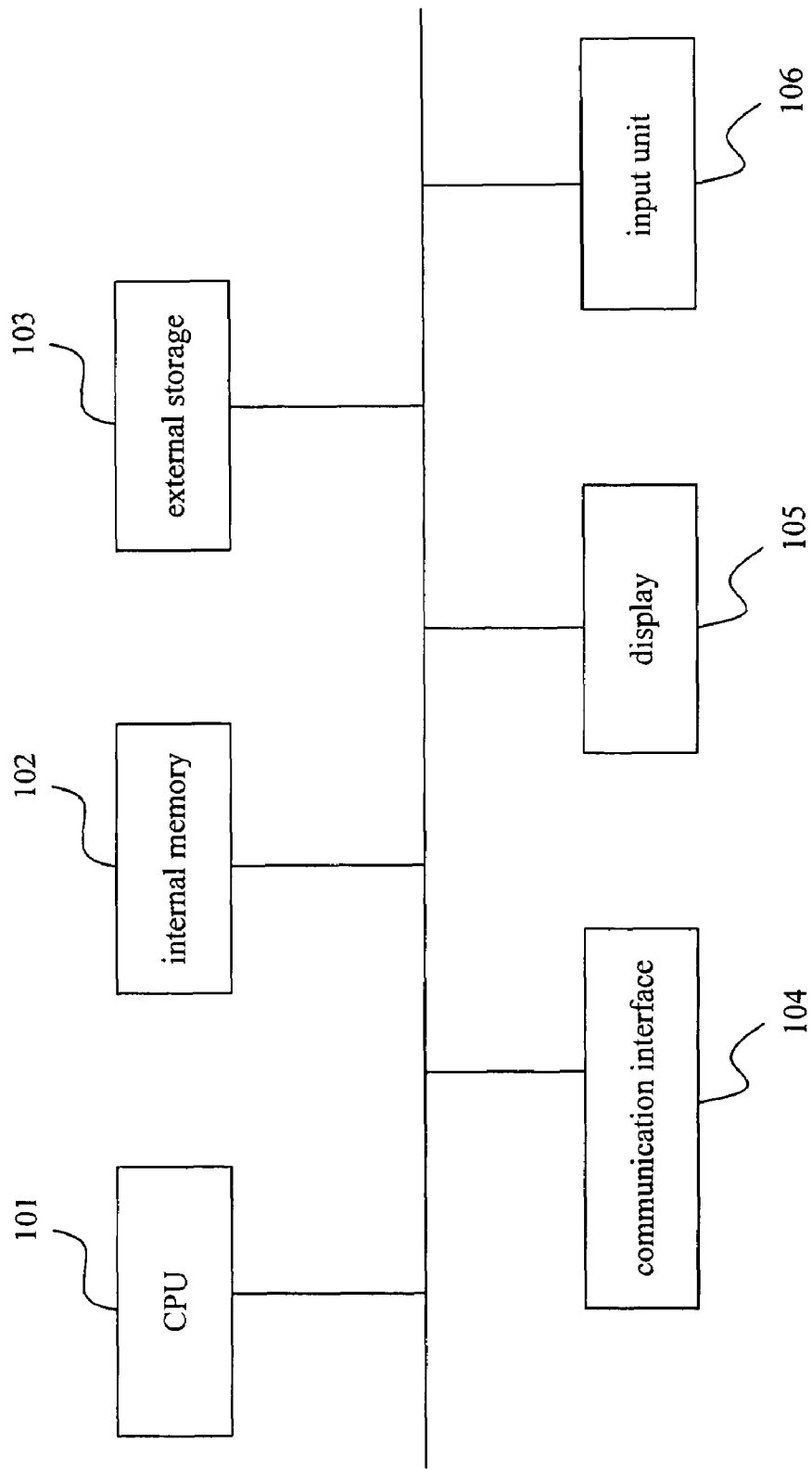
FIG. 8 is a hardware configuration diagram illustrating an embodiment according to the invention.

FIG. 8 is a device configuration diagram illustrating a weak key condition detector in this embodiment. As shown in FIG. 8, the cipher strength evaluation apparatus is a general purpose computer, for example, having a CPU 101, an internal memory 102, an external storage 103 such as HDD, a communication interface 104 such as a modem for connecting to communication networks, a display 105, and an input apparatus 106 such as a mouse and a keyboard.

Figure 9:
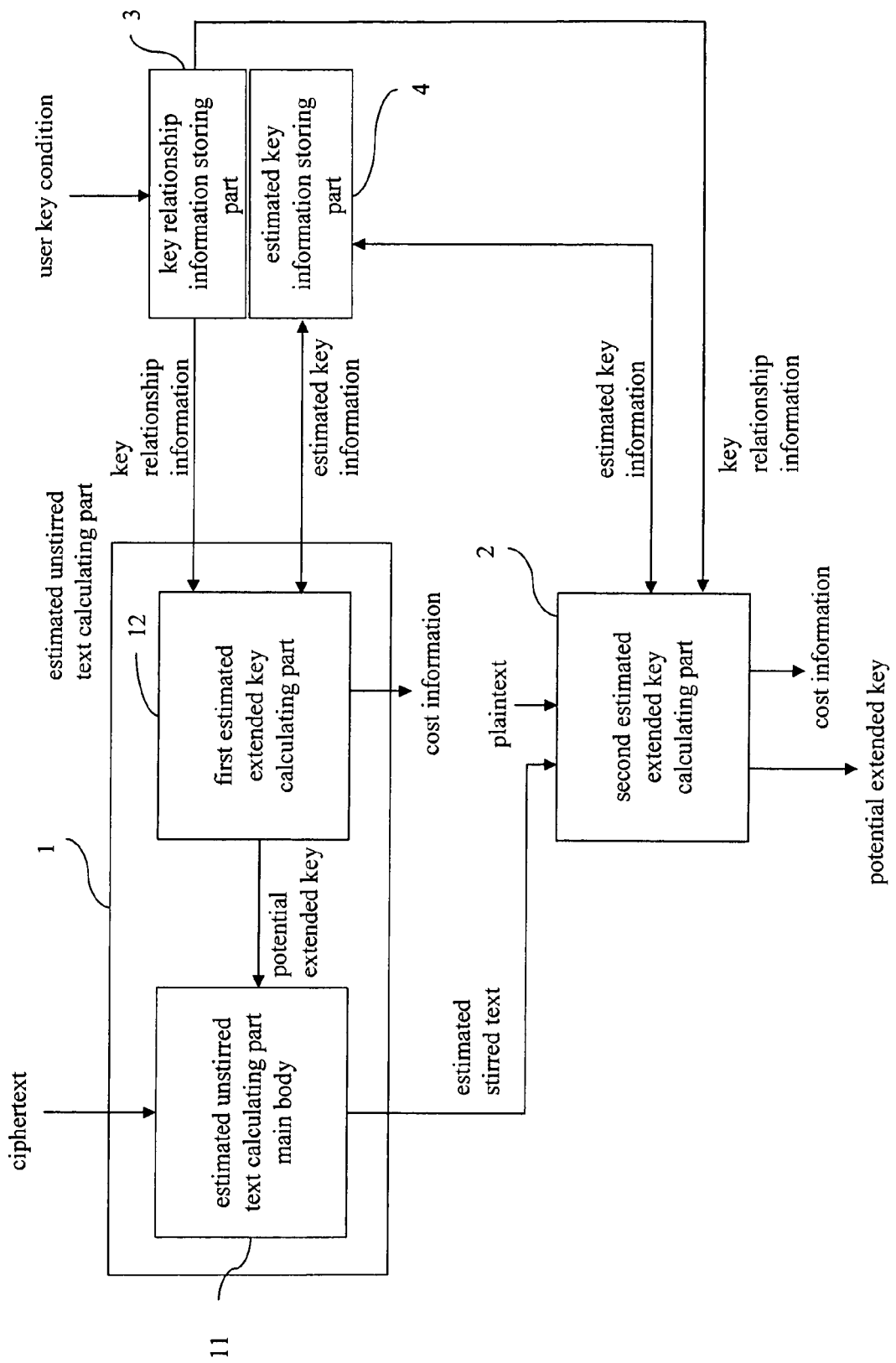
FIG. 9 is a function configuration diagram illustrating a cipher strength evaluation apparatus of a first embodiment.
Figure 10:
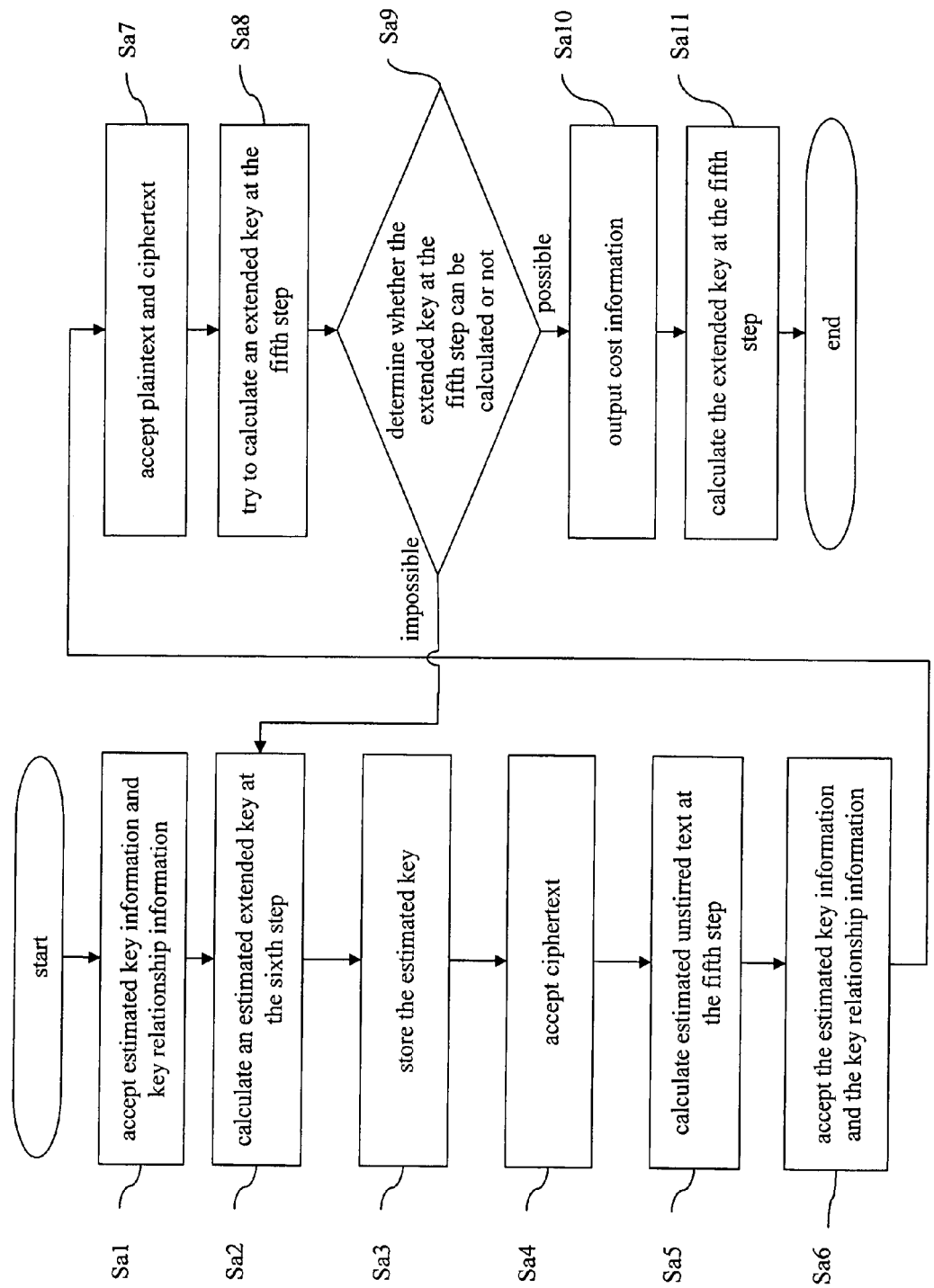
FIG. 10 is a flowchart illustrating an example of the operation of the cipher strength evaluation apparatus of the first embodiment.
Figure 11:
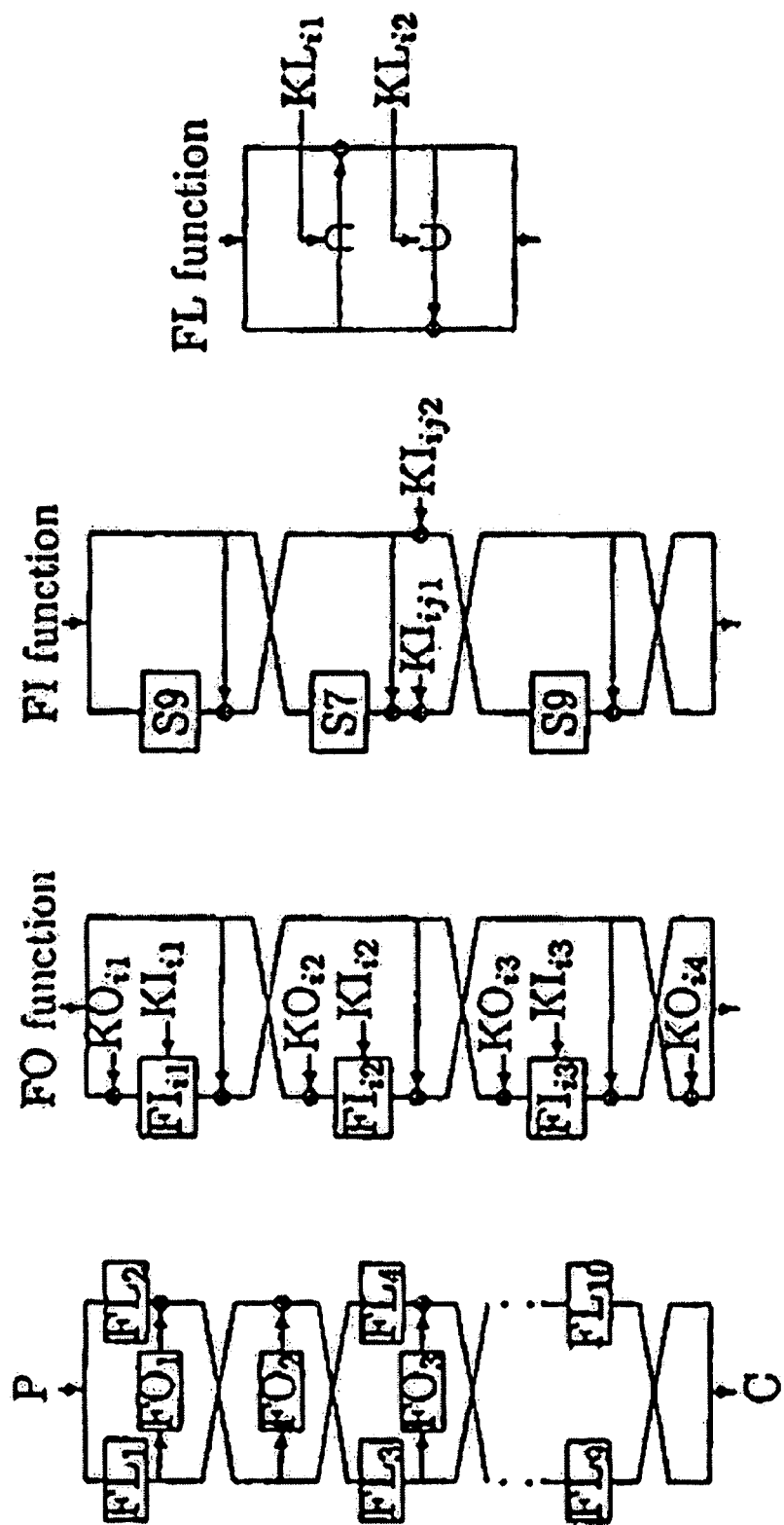
FIG. 11 is a function configuration diagram illustrating the outline of the function configuration of MISTY1.
Figure 12:
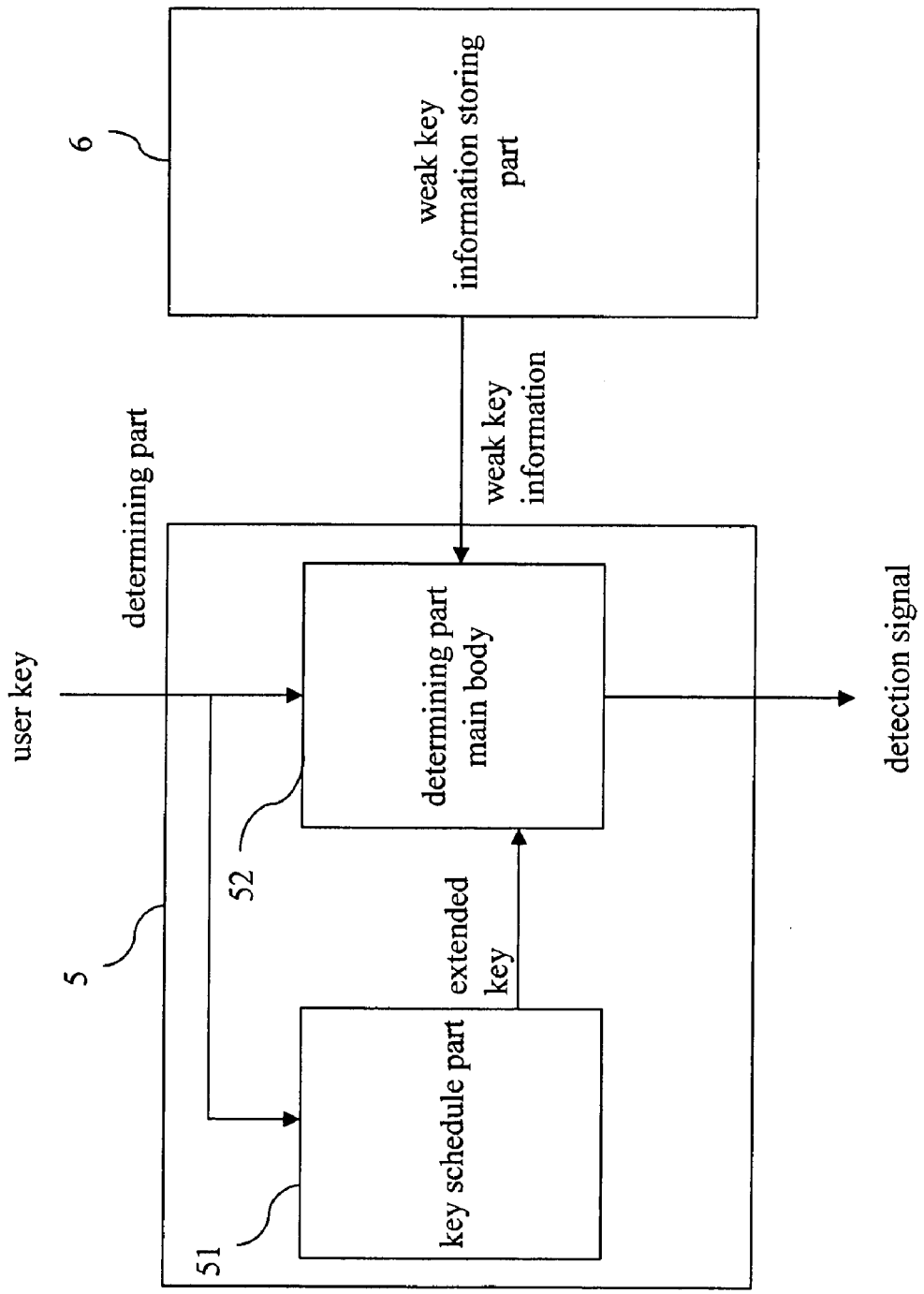
FIG. 12 is a function configuration diagram illustrating a weak key detector of a second embodiment.

In the embodiment, as shown FIG. 9, a predetermined program is installed in the computer, and the CPU 101 and peripheral devices are operated together based on the program, which allows the apparatus to function as an estimated unstirred text calculating part 1, a second estimated extended key calculating part 2, a key relationship information storing part 3, and an estimated key information storing part 4.

Hereinafter, each of the parts will be described.

Reference numeral 1 is the estimated unstirred text calculating part for calculating estimated unstirred text at a sixth step by estimating an extended key used at the sixth step of stirring based on ciphertext outputted from the encryption apparatus, having an estimated unstirred text calculating part main body 11 for calculating estimated unstirred text and a first estimated extended key calculating part 12 for calculating estimated extended keys by exhaustive search.

Reference numeral 2 is the second estimated extended key calculating part for accepting the estimated unstirred text at the sixth step as estimated stirred text at a fifth step to calculate an estimated extended key at the fifth step based on the estimated stirred text at the fifth step.

Reference numeral 3 is the key relationship information storing part for storing the relationship held deterministically or probabilistically between a user key and an extended key obtained by analyzing a key schedule part of the encryption apparatus, or between extended keys. Reference numeral 4 is the estimated key information storing part for storing a key condition assumed beforehand or a part or all of the user keys and the extended keys estimated by each of the estimated extended key calculating parts.

Hereinafter, the second estimated extended key calculating part will be described in detail.

The second estimated extended key calculating part 2 is that adapts an algebraic technique to a decryption equation utilizing higher order differences in which the estimated extended key at the fifth step cannot be estimated when the estimated extended key at the sixth step is wrong whereas the estimation of the extended key at the fifth step becomes right when the estimated extended key at the sixth step is right.

Furthermore, in addition to calculating the extended key, the second estimated extended key calculating part 2 outputs cost information such as calculation resources or complexity required for calculating it as an extended key calculating condition evaluation part.

First, the calculation method of the extended key will be described below.

In consideration of higher order differences, $X \in GF(2)^n$ is a variable vector, $$X=(x_1, x_2, \ldots, x_i), x_i (i \infty 1, 2, \ldots, n) \in GF(2)^n$$

$F(.)$ is an encryption Boolean function including key K. Furthermore, $Y \in GF(2)^n$ is outputted.

$$Y=F(X;K) \qquad (1)$$

$(A_1, A_2, \ldots, A_i)$ is i vectors linearly independent on $GF(2)^n$. The subspace of $GF(2)^i$ spanned by these is expressed by $V^{(i)}$. The ith-order difference $$\Delta^{(i)}_{V(i)} F(X; K)$$

on X of the function F(X;K) is defined by an equation below.

$$\Delta^{(i)}_{V(i)} F(X; K) = \bigoplus_{A \in V(i)} F(X \oplus A; K) \qquad (2)$$

Hereinafter, $$\Delta_{V(i)}^{(i)}$$

is abbreviated to $\Delta^{(i)}$, when not defined particularly.

When the order on X of the function $F(X;K)$ is N, $$deg_X\{F(X;K)\} = N \Rightarrow \begin{cases} \Delta^{(N+1)}F(X;K) = 0 \\ \Delta^{(N)}F(X;K) = \text{const} \end{cases} \quad (3)$$

is always held, not depending on X, K.

Then, in the case of a Feistel cipher formed of i steps, an output value $Z_{i-2}$ at the i−2th step on the output side of the F function is XOR-ed with the output at the ith step to and outputted as cipher. When the output order at the i−2th step to the input X is N, $$\begin{cases} \Delta^{(N+1)}Z_{i-2}(X) = 0 \\ \Delta^{(N)}Z_{i-2}(X) = \text{const} \end{cases} \quad (4)$$

is held for the higher order difference value of $Z_{i-2}$ from Equation (3). In the meantime, the relationship, $$F(C_L(X);K_i) \oplus C_R(X) = Z_{i-2}(X) \quad (5)$$

is held at the ith step to be the last step. $K_i$ is the key used at the last step, and $C_L(X)$ and $C_R(X)$ is the left block and the right block of ciphertext corresponding to plaintext X. The following is held from Equations (4) and (5).

$$\begin{cases} \bigoplus_{A \in V^{(N)}} F(C_L(X); K_i) \oplus C_R(X) = \text{const} \\ \bigoplus_{A \in V^{(N+1)}} F(C_L(X); K_i) \oplus C_R(X) = 0 \end{cases} \quad (6)$$

In Equation (6), integration is held where the unknown key $K_i$ is right. Therefore, since the true key $K_i$ is obtained by solving Equation (6), hereinafter, it is called a decryption equation.

The algebraic technique is that supposing the sum of redefined unknowns is L after the decryption equation is transformed to a linear equation, an L×L coefficient matrix is calculated and then the equation is solved with Gauss-Jordan elimination.

Next, costs will be described below.

Suppose the decryption equation is derived with Nth-order differences paying attention on b bits of an output sub-block, b of equation linear equations are obtained from a single Nth-order difference, and [L/b] of Nth-order differences are needed to determine all the unknowns. To calculate the coefficient matrix by the same method as that in References [1] and [2], the F function needs to be calculated at 2N×[L/b]×L times.

Moreover, consider to estimate the number of selected plaintext and complexity required for solving an attack equation as different S bits of an unknown S of is estimated by exhaustive search. Suppose extra α equations are prepared, a false S is held at a probability of $2^{-\alpha}$. Therefore, when there is α that satisfies $2^{S-\alpha} \ll 1$, all the false Ss can be eliminated. Thus, in order to solve the decryption equation by a method combining exhaustive search with the algebraic solution method, 2N×[(L+α)/b] of selected plaintext is required and the function F needs to be calculated at 2N+α×[(L+α)/b]×L times.

Next, procedures for actually evaluating the cipher strength of MISTY with six rounds with the cipher strength evaluation apparatus will be shown below.

First, the relationship held between keys is stored in the key relationship information storing part 3. More specifically, for example, extended keys for all of or samples of user keys are calculated based on a key schedule and the relationship held between segment bit patterns of keys is stored in the key relationship information storing part 3. Alternatively, an encryption algorism is analyzed, and the relationship considered to be held between keys is stored in the key information storing part 3. Subsequently, a key condition is stored that is to be verified whether to be weak key condition. Here, consider to fix the extended keys as below.

$$KL_{21} = KL_{31} = 0x0000$$

$$KL_{22} = KL_{32} = 0xffff \quad (7)$$

With this assumption, it is known that the value of a seventh-order difference of MISTY at the third round becomes a constant, and this condition is calculated back from the key schedule to be the key condition relating to the user key. Thus, $$K'_3 = K_2 = 0x0000$$

$$K_5 = K'_8 = 0xffff \quad (8),$$

the condition for the user key, is assumed to be a weak key condition, and is stored as the key condition in the estimated key information storing part 4.

Where $$K'_3 = FI(K_3;K_4)$$

$$K'_8 = FI(K_8;K_1) \quad (9).$$

Then, MISTY1 with six rounds is performed to prepare for utilizing a pair of given plaintext and ciphertext obtained by encrypting the plaintext with the user key satisfying the key condition.

Next, one example of the operation of the cipher strength evaluation apparatus will be described with reference to a flowchart shown in FIG. 9.

The first estimated extended key calculating part 12 accepts estimated key information from the estimated key information storing part 4, and it searches, retrieves and accepts the relating key relationship information from the key relationship information storing part 3 based on the estimated key information (Sa1).

Then, the first estimated extended key calculating part 12 calculates one estimated extended key that is estimated to be an extended key having been used for stirring at the sixth step by exhaustive search (Sa2).

The estimated extended key is stored in the estimated key information storing part 4. Furthermore, when a segment bit pattern of the user key is determined based on the estimated extended key calculated, the segment bit pattern is also stored as the estimated segment bit pattern in the estimated key information storing part 4 (Sa3).

The estimated unstirred text calculating part 1 accepts ciphertext (Sa4), and uses the estimated extended key to calculate estimated unstirred text at the sixth step from the ciphertext (Sa5).

The second estimated extended key calculating part 2 accepts the estimated key information from the estimated key information storing part 4, and it searches, retrieves and accepts the relating key relationship information from the key relationship information storing part 3 based on the estimated key information (Sa6).

Moreover, the second estimated extended key calculating part 2 accepts plaintext and the estimated unstirred text at the sixth step (Sa7).

The second estimated extended key calculating part 2 tries to calculate an estimated extended key at a fifth step from an algebraic technique based on the deterministic condition included in the key relationship information, in addition to the estimated unstirred text at the sixth step and the decryption equation (Sa8).

In the process of calculating the extended key at the fifth step, determine whether it is acceptable or not. When the estimated extended key at the sixth step is different from the extended key actually used in encryption, it becomes impossible to calculate the extended key at the fifth step. Therefore, the estimated extended key at the sixth step is recalculated, and repeat it until the calculation becomes possible (Sa9).

When it becomes possible to calculate the extended key, it is outputted as cost information about calculation resources and complexity required for the calculation (Sa10). The estimated extended key at the fifth step is calculated, and then end the procedures (Sa11).

In this manner, since the extended key is calculated based on the key relationship information and the estimated key information as well as based on the decryption equation and the estimated unstirred text at the sixth step as shown in Sa8, the relationship between the extended keys at the sixth step and the fifth step and the relationship between the user key and the extended key at the fifth step can be utilized for calculating the extended key at the fifth step.

In addition, the extended key at the sixth step is determined and the user key is determined as well in the embodiment. Also in this case, since the first estimated extended key calculating part 12 estimates the segment bit pattern of the user key after calculating the estimated extended key as shown in Sa3, the event that the user key is determined can be known easily.

Besides, since the cost information required for calculation is also outputted, it can be verified whether the key condition is set beforehand is the weak key condition. In the embodiment, independent unknowns are 13,269, and $2^{18.9}$ pairs of plaintext and ciphertext and the calculation of the F function at $2^{80.6}$ times reveal that decryption is possible, showing that the key condition is the weak key condition.

Furthermore, in addition to this, the invention can be modified within the scope not deviating from the teachings.

For example, the weak key condition can be detected automatically in which the cipher strength evaluation apparatus is allowed to estimate the weak key condition automatically and to repeat verification whether the weak key condition is true or not. When this configuration is formed, more deterministic or probabilistic relationships between keys or the key condition to be the segment bit patterns of keys having the relationship held between the keys at high probability are sequentially verified as key relationship information, which allows weak keys to be detected efficiently.

Moreover, since the key relationship information is searched based on the estimated key information, the key relationship information storing part desirably has indexes and does high-speed search like DBMS. Besides, it can also be considered to store the condition satisfied by differences or higher order differences of keys.

In exhaustive search, it can be configured to sequentially calculate as the estimated extended key in order of keys with higher possibility based on the estimated key information and the key relationship information. More specifically, it is acceptable to perform exhaustive search by priority in which bits and bit patterns estimated at high probability are assumed.

Then, it is fine that the algebraic calculation method used in the second estimated extended key calculating part is equations formulated based on differences, not limited to those based on higher order differences.

A second embodiment will be described.

This apparatus is allowed to function as a determining part 5 and a weak key information storing part 6 by installing a predetermined program in a computer similar to that of the previous embodiment and operating a CPU 101 and peripheral devices together based on the program.

Hereinafter, each of the parts will be described.

Reference numeral 5 is the determining part for accepting a user key scheduled to be inputted into an encryption apparatus for use, determining whether the user key is a weak key, and outputting a detection signal for indicating that it is a weak key when it is. The determining part 5 has a key schedule part 51 as similar to that used for calculating an extended key from the user key by the encryption apparatus, and a determining part main body 52 for determining whether the segment bit patterns of the user key and the extended key calculated by the key schedule part 51 satisfy the weak key condition in weak key information to output a detection signal.

Reference numeral 6 is the weak key information storing part for storing the key condition having been verified in the previous embodiment, which stores the weak key condition being the key condition having been verified as the key condition to lower the difficulty of decryption in a certain encryption apparatus. The key condition is expressed by the segment bit patterns of the user key and the extended key.

Procedures to detect a weak key by using the weak key detector are shown below.

The key condition having been verified to lower the difficulty of decryption by the cipher strength evaluation apparatus is first stored in the weak key information storing part 6.

Figure 13:
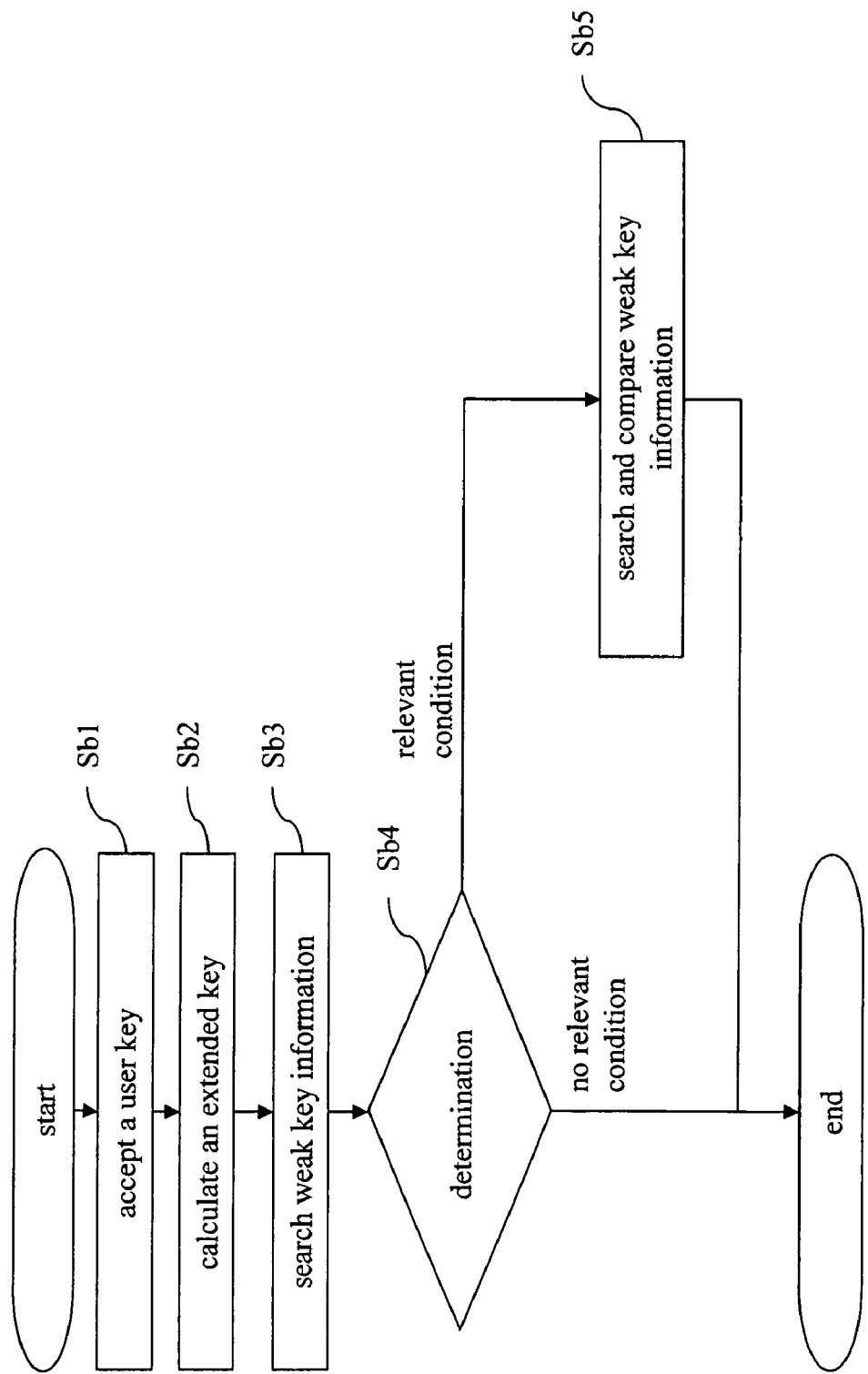
FIG. 13 is a flowchart illustrating an example of the operation of the weak key detector of the second embodiment.

Next, one example of the operation of the weak key detector will be described below with reference to a flowchart shown in FIG. 13.

First, the determining part 5 accepts a user key (Sb1) Then, the key schedule part 51 calculates an extended key based on the user key (Sb2). The determining part main body 52 searches a relevant weak key condition from weak key information stored in the weak key information storing part 6 based on the user key and the extended key (Sb3), and determines whether the user key is a weak key depending on whether there is the relevant weak key condition (Sb4). It outputs a detection signal when it determines it is a weak key (Sb5).

The weak key information is stored as described above, the key condition formed of the segment bit patterns of the user key and a plurality of the extended keys used in the cipher strength evaluation apparatus of the previous embodiment can be stored, and it can be determined whether the user key satisfies the weak key condition with no complex operations.

In addition, the invention can be modified variously within the scope not deviating from the teachings.

For example, when the user key is not a weak key, it is acceptable to allow the determining part to output a signal indicating that it is not a weak key, or it is fine to allow the determining part to output information showing a degree of the difficulty of decryption in accordance with the inputted user key.

Furthermore, DBMS is preferable that has indexes such as a bit map for every bit in order to search weak key information, but it is acceptable to determine whether to be a weak key from the result of logic operations based on the user key and weak key information, not searching the weak key condition.

What is claimed is:

1. A cipher strength evaluation apparatus for evaluating strength on ciphertext obtained by an encryption apparatus having a plurality of steps of accepting unstirred text, stirring with an extended key calculated from a user key based on a key schedule, and outputting stirred text for encrypting plaintext step by step, the cipher strength evaluation apparatus comprising:

a key relationship information storing part for storing key relationship information determined by the key schedule and showing a relationship between a segment bit pattern of the user key and a segment bit pattern of the extended key thereof;

an estimated key information storing part for storing estimated key information about an estimated extended key estimated as equal to the extended key and an estimated user key estimated as equal to the user key; and an estimated unstirred text calculating part for calculating estimated unstirred text estimated as equal to unstirred text at a certain stirring step based on ciphertext or estimated stirred text estimated as equal to stirred text at that stirring step, wherein the estimated unstirred text calculating part includes:

an estimated extended key calculating part for calculating an estimated extended key based on the key relationship information stored in the key relationship information storing part and the estimated key information stored in the estimated key information storing part and storing the estimated extended key in the estimated key information storing part, and an estimated unstirred text calculating part main body for calculating estimated unstirred text based on ciphertext or the estimated stirred text, and the estimated extended key.

2. A cipher strength evaluation apparatus for evaluating strength on ciphertext obtained by an encryption apparatus having a plurality of steps of accepting unstirred text, stirring with an extended key calculated from a user key based on a key schedule, and outputting stirred text for encrypting plaintext step by step, the cipher strength evaluation apparatus comprising:

a key relationship information storing part for storing key relationship information determined by the key schedule and showing a relationship between a segment bit pattern of the user key and a segment bit pattern of the extended key thereof;

an estimated key information storing part for storing estimated key information about an estimated extended key estimated as equal to the extended key and an estimated user key estimated as equal to the user key; and an estimated unstirred text calculating part for calculating estimated unstirred text estimated as equal to unstirred text at a certain step based on ciphertext or estimated stirred text estimated as equal to stirred text at that step, wherein the estimated unstirred text calculating part includes:

an estimated extended key calculating part for calculating the estimated extended key by exhaustive search based on a probabilistic relationship probabilistically held between keys contained in the key relationship information stored in the key relationship information storing part and the estimated key information stored in the estimated key information storing part and storing it in the estimated key information storing part, and an estimated unstirred text calculating part main body for calculating estimated unstirred text based on ciphertext or the estimated stirred text, and the estimated extended key.

3. A cipher strength evaluation apparatus for evaluating strength on ciphertext obtained by an encryption apparatus having a plurality of steps of accepting unstirred text, stirring with an extended key calculated from a user key based on a key schedule, and outputting stirred text for encrypting plaintext step by step, the cipher strength evaluation apparatus comprising:

a key relationship information storing part for storing key relationship information determined by the key schedule and showing a relationship between a segment bit pattern of the user key and a segment bit pattern of the extended key thereof;

an estimated key information storing part for storing estimated key information about an estimated extended key estimated as equal to the extended key and an estimated user key estimated as equal to the user key; and an estimated unstirred text calculating part for calculating estimated unstirred text estimated as equal to unstirred text at a certain step based on ciphertext or estimated stirred text estimated as equal to stirred text at that step, wherein the estimated unstirred text calculating part includes:

an estimated extended key calculating part for calculating an estimated extended key by an algebraic technique based on ciphertext or estimated stirred text, plaintext or estimated unstirred text, a deterministic relationship deterministically held between keys contained in the key relationship information stored in the key related information storing part, and the estimated key information stored in the estimated key information storing part, and storing the estimated extended key in the key information storing part, and an estimated unstirred text calculating part main body for calculating estimated unstirred text estimated as equal to unstirred text based on ciphertext or the estimated stirred text, and the estimated extended key.

4. A cipher strength evaluation apparatus for evaluating strength on ciphertext obtained by an encryption apparatus having a plurality of steps of accepting unstirred text, stirring with an extended key calculated from a user key based on a key schedule, and outputting stirred text for encrypting plaintext step by step, the cipher strength evaluation apparatus comprising:

a key relationship information storing part for storing key relationship information determined by the key schedule and showing a relationship between a segment bit pattern of the user key and a segment bit pattern of the extended key thereof;

an estimated key information storing part for storing estimated key information about an estimated extended key estimated as equal to the extended key and an estimated user key estimated as equal to the user key; and an estimated unstirred text calculating part for calculating estimated unstirred text estimated as equal to unstirred text at a certain step based on ciphertext or estimated stirred text estimated as equal to stirred text at that step, and a second estimated extended key calculating part for calculating an estimated extended key at a certain step, wherein the estimated unstirred text calculating part includes:

a first estimated extended key calculating part for calculating the estimated extended key by exhaustive search based on the estimated key information stored in the estimated key information storing part and storing it in the estimated key information storing part, and an estimated unstirred text calculating part main body for calculating estimated unstirred text estimated as equal to unstirred text based on ciphertext or estimated stirred text, and the estimated extended key, and the second estimated extended key calculating part for calculating an estimated extended key by an algebraic technique based on estimated stirred text, plaintext or estimated unstirred text, a deterministic relationship deterministically held between keys contained in the key relationship information stored in the key related information storing part, and the estimated key information stored in the estimated key information storing part, and storing the estimated extended key in the key information storing part.

5. A cipher strength evaluation apparatus for evaluating strength on ciphertext obtained by an encryption apparatus having a plurality of steps of accepting unstirred text, stirring with an extended key calculated from a user key based on a key schedule, and outputting stirred text for encrypting plaintext step by step, the cipher strength evaluation apparatus comprising:

a key relationship information storing part for storing key relationship information determined by the key schedule and showing a relationship between a segment bit pattern of the user key and a segment bit pattern of the extended key thereof;

an estimated key information storing part for storing estimated key information about an estimated extended key estimated as equal to the extended key and an estimated user key estimated as equal to the user key; and an extended key calculating condition evaluation part for outputting cost information about a calculation resource or complexity required for calculating an estimated extended key based on the key relationship information stored in the key relationship information storing part and the estimated key information stored in the estimated key information storing part.

6. A cipher strength evaluation apparatus for evaluating strength on ciphertext obtained by an encryption apparatus having a plurality of steps of accepting unstirred text, stirring with an extended key calculated from a user key based on a key schedule, and outputting stirred text for encrypting plaintext step by step, the cipher strength evaluation apparatus comprising:

a key relationship information storing part for storing key relationship information determined by the key schedule and showing a relationship between a segment bit pattern of the user key and a segment bit pattern of the extended key thereof;

an estimated key information storing part for storing estimated key information about an estimated extended key estimated as equal to the extended key and an estimated user key estimated as equal to the user key; and an extended key calculating condition evaluation part for outputting cost information about a calculation resource or complexity required for calculating the estimated extended key by exhaustive search based on a probabilistic relationship probabilistically held between keys contained in the key relationship information stored in the key relationship information storing part and the estimated key information stored in the estimated key information storing part.

7. A cipher strength evaluation apparatus for evaluating strength on ciphertext obtained by an encryption apparatus having a plurality of steps of accepting unstirred text, stirring with an extended key calculated from a user key based on a key schedule, and outputting stirred text for encrypting plaintext step by step, the cipher strength evaluation apparatus comprising:

a key relationship information storing part for storing key relationship information determined by the key schedule and showing a relationship between a segment bit pattern of the user key and a segment bit pattern of the extended key thereof;

an estimated key information storing part for storing estimated key information about an estimated extended key estimated as equal to the extended key and an estimated user key estimated as equal to the user key; and an extended key calculating condition evaluation part for outputting cost information about a calculation resource or complexity required for calculating an estimated extended key by an algebraic technique based on ciphertext or estimated stirred text, plaintext or estimated unstirred text, a deterministic relationship deterministically held between keys contained in the key relationship information stored in the key related information storing part, and the estimated key information stored in the estimated key information storing part.

8. A cipher strength evaluation apparatus for evaluating strength on ciphertext obtained by an encryption apparatus having a plurality of steps of accepting unstirred text, stirring with an extended key calculated from a user key based on a key schedule, and outputting stirred text for encrypting plaintext step by step, the cipher strength evaluation apparatus comprising:

a key relationship information storing part for storing key relationship information determined by the key schedule and showing a relationship between a segment bit pattern of the user key and a segment bit pattern of the extended key thereof;

an estimated key information storing part for storing estimated key information about an estimated extended key estimated as equal to the extended key and an estimated user key estimated as equal to the user key; and an estimated unstirred text calculating part for calculating estimated unstirred text estimated as equal to unstirred text at a certain step based on ciphertext or estimated stirred text estimated as equal to stirred text at that step, and an extended key calculating condition evaluation part for calculating cost information required for calculating an extended key, wherein the estimated unstirred text calculating part includes:

an estimated extended key calculating part for calculating the estimated extended key by exhaustive search based on the estimated key information stored in the estimated key information storing part and storing it in the estimated key information storing part, and an estimated unstirred text calculating part main body for calculating estimated unstirred text estimated as equal to unstirred text based on ciphertext or estimated stirred text, and the estimated extended key, and the extended key calculating condition evaluation part outputs cost information about a calculation resource or complexity required for calculating an estimated extended key by an algebraic technique based on estimated stirred text, plaintext or estimated unstirred text, a deterministic relationship deterministically held between keys contained in the key relationship information stored in the key related information storing part, and the estimated key information stored in the estimated key information storing part.

* * * * *